US005339583A

United States Patent [19]

Hrdlicka et al.

[11] Patent Number: 5,339,583

[45] Date of Patent: Aug. 23, 1994

[54] WINDOW SASH AND METHOD OF CONSTRUCTING SAME

[75] Inventors: Fred L. Hrdlicka, Pella; Gary R. Newman, Knoxville; Mearl J. Minter, Oskaloosa, all of Iowa

[73] Assignee: Pella Corporation, Pella, Iowa

[21] Appl. No.: 822,157

[22] Filed: Jan. 17, 1992

[51] Int. Cl.[5] .......................... E06B 1/04; B32B 31/00

[52] U.S. Cl. ................................ 52/204.53; 52/204.5; 52/780; 156/293

[58] Field of Search ................. 52/398, 399, 400, 208, 52/211, 397, 776, 775, 780, 204.53, 204.5; 156/106, 108, 293, 295

[56] References Cited

U.S. PATENT DOCUMENTS

| | | | |
|---|---|---|---|
| 1,085,605 | 2/1914 | Gunn . | |
| 2,052,229 | 8/1936 | Hyde . | |
| 2,286,890 | 6/1942 | Birt . | |
| 2,803,320 | 8/1957 | Wagner . | |
| 2,848,761 | 8/1958 | Hahn | 52/208 |
| 3,214,212 | 10/1965 | Horton | 52/400 |
| 3,803,779 | 4/1974 | Kuyper et al. . | |
| 3,974,606 | 8/1976 | LeBorde . | |
| 4,164,107 | 8/1979 | Kraemling et al. . | |
| 4,165,119 | 8/1979 | Hedeen et al. | 52/400 |
| 4,259,135 | 3/1981 | Kulla . | |
| 4,434,593 | 3/1984 | Horike et al. . | |

*Primary Examiner*—Michael Safavi

*Attorney, Agent, or Firm*—Zarley, McKee, Thomte, Voorhees & Sease

[57] ABSTRACT

A single or double glazing panel is received in a groove in a wood sash frame. The glazing panel carries on it a bead of butyl sealant along the exterior face adjacent the peripheral edge while a bead of silicone adhesive is placed on the peripheral edge or in the bottom of the groove. Insertion of the panel into the groove causes the sealant to roll and flow along the exterior wall of the groove and along the exterior face of the glazing panel such that no cleanup after assembly is required. Adhesive is prevented from contacting viewable areas of the glazing thereby avoiding cleanup. Cladding may be placed over the exterior of the wood sash frame covering the sealant and space in which it is contained.

19 Claims, 2 Drawing Sheets

WINDOW SASH AND METHOD OF CONSTRUCTING SAME

BACKGROUND OF THE INVENTION

The window sash and method of construction disclosed in U.S. Pat. No. 3,803,779 to Kuyper et al. is representative of the prior art to which this invention is an improvement. Previously a strip of tape would be placed over the groove and the glazing would then be inserted into the groove causing the tape to shape itself around the glazing on opposite sides. The tape would then need to be trimmed away with a blade as seen in FIGS. 13 and 14 of the present disclosure.

Other problems associated with using silicone in groove glazing includes handling. The silicone must have one to six hours to cure. Clean up is a problem since once silicone gets on the glass it is nearly impossible to remove it.

SUMMARY OF THE INVENTION

This invention solves the problems of the prior art. Butyl sealant is placed on the outside face of the glazing and when the glazing is inserted into the groove the butyl is rolled along the exterior wall of the groove while silicone adhesive in the bottom of the groove or on bottom edge of glazing is spread up to meet it but is prevented by the sealant from spreading onto the visible portion of the glass. The butyl sealant also holds the sash members onto the glass until the silicone cures.

Cladding may be placed on the exterior of the sash frame. The cladding may have a nose portion which extends into the sealant thereby covering it and concealing it. The nose of the cladding may have an inner and an outer nose portion with the inner nose portion engaging the glass in spaced relationship to the outer nose portion engaging the sealant.

DESCRIPTION OF PREFERRED EMBODIMENT

Figure 1:
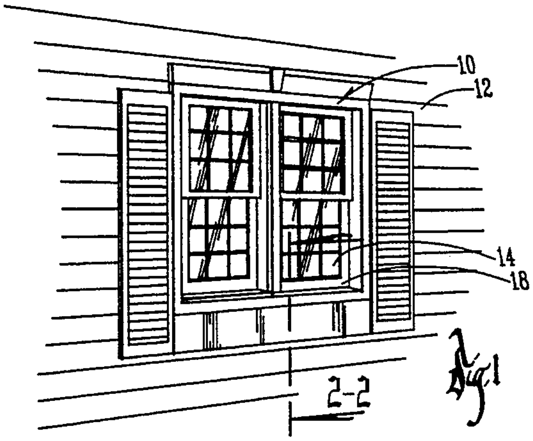
FIG. 1 is a fragmentary perspective view of a building having a window arrangement which includes the window sash of this invention.

The window sash of this invention is referred to generally in FIG. 1 by the reference numeral 10 in a wall 12.

Figure 3:
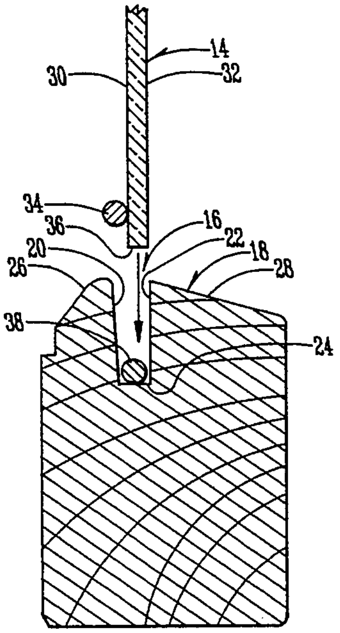
FIGS. 3–5 are views similar to FIG. 2 but illustrating the sequential steps of assembling the glazing into the sash frame.

A single pane of glazing 14 is received in a U-shaped groove or channel 16 in a sash wood frame 18. The groove 16 is defined by an exterior wall 20 and an interior wall 22 on opposite sides of a bottom wall 24. The exterior wall 20 tapers slightly towards the interior as seen in FIG. 3. The groove 16 is between an exterior and interior stops 26 and 28.

The transparent glazing pane 14 has an exterior face 30 and an interior face 32. A bead of multiple non adhesive butyl sealant 34 is placed on the exterior face 30 adjacent the peripheral edge 36. Silicone adhesive 38 is placed in the bottom of the groove 16 on the bottom wall 24.

Figure 2:
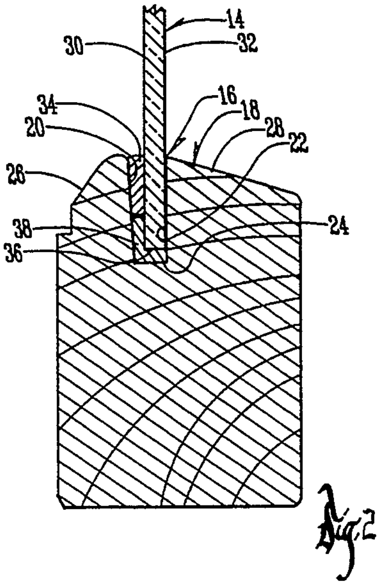
FIG. 2 is a cross sectional view taken along line 2—2 in FIG. 1.
Figure 4:
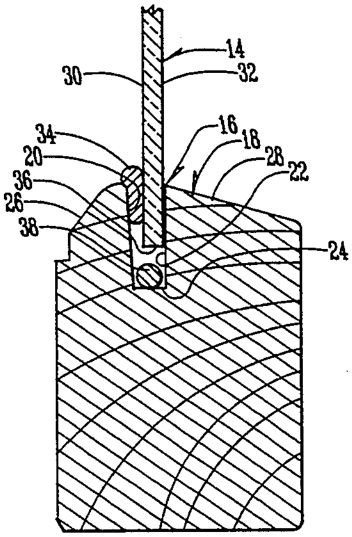
Figure 5:
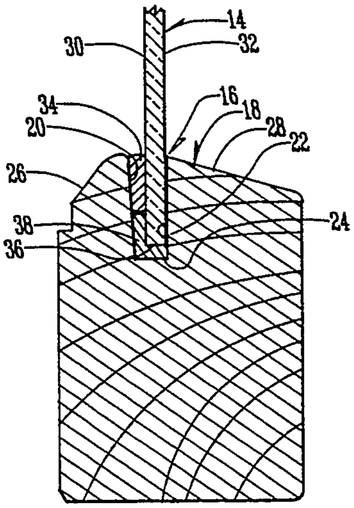
Figure 13:
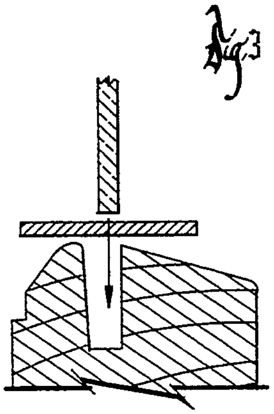
Fig. 13 ( PRIOR ART )
FIGS. 13 and 14 are views similar to FIGS. 3–5 but illustrating the prior art structure and method of assembling same.
Figure 14:
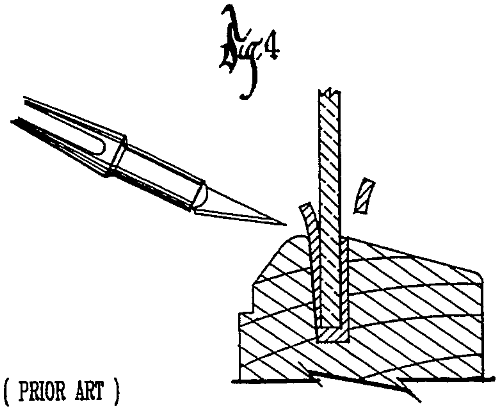
Fig. 14 ( PRIOR ART )
Figure 6:
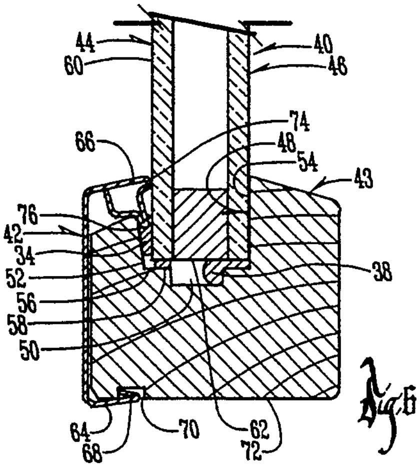
FIG. 6 is a view similar to FIG. 2 but illustrating insulated double glazing and cladding on the exterior of the sash frame.

The assembly of the glazing pane 14 into the groove 16 is illustrated in FIGS. 3–5 wherein the glazing 14 is moved downwardly causing the elongated bead of sealant 34 to flow and spread along the exterior face 30 of the glazing 14 and the exterior wall 20 of the groove 16. When the glazing pane 14 is fully inserted into the groove 16 as seen in FIGS. 2 and 5 the peripheral edge 36 of the glazing 14 presses against the silicone adhesive forcing it upwardly until it meets the downwardly flowing sealant 34. The interior face 32 of the pane 14 is in direct contact with the interior wall 22 of the groove 16. The butyl sealant 34 is spread or rolled such that it is substantially totally confined in the space between the pane 14 and the exterior wall 20 of the groove 16 and thus no cleanup is required as is the case with the prior art as illustrated in FIGS. 13 and 14. It is also seen that no silicone adhesive 38 is permitted to contact either visible interior or exterior face of the glazing 14 thereby avoiding any cleanup being required to remove adhesive from the glazing. The butyl sealant 34 will securely hold the frame 18 to the glazing pane 14 until the silicone adhesive sets up in approximately six hours.

In FIGS. 6–12 an alternate embodiment is illustrated wherein insulated double pane glazing 40 is used and metal cladding 42 is attached to the exterior of the wood frame 43.

The glazing 40 includes an exterior pane 44 and an interior pane 46. A primary groove 48 which includes a secondary groove or channel 50 is defined by an exterior wall 52 and an interior wall 54. The groove 48 includes a bottom wall 56 in which the secondary groove 50 is formed. A series of compressible pads 58 are provided along the bottom wall 56 adjacent the exterior wall 52 of the groove 48.

Figure 7:
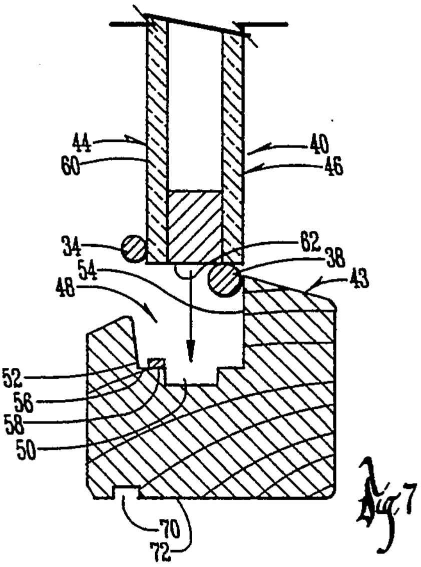
FIGS. 7–10 are views similar to FIG. 6 but illustrating the sequential steps of assembly.
Figure 8:
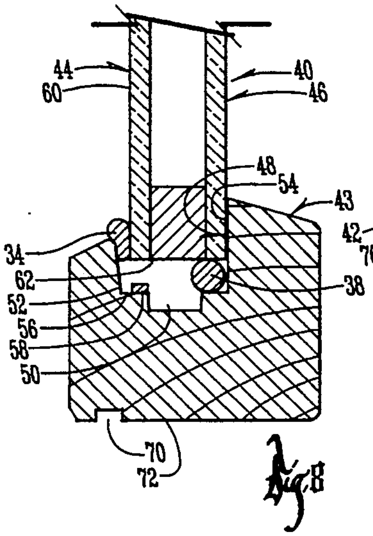
Figure 9:
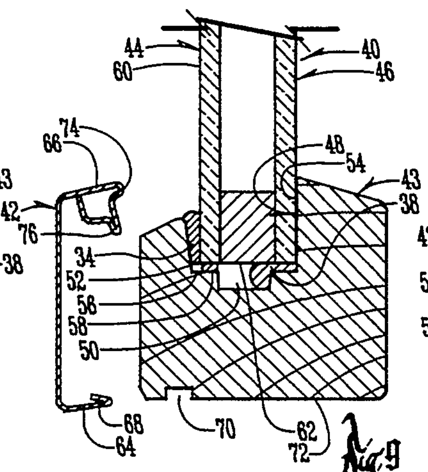
Figure 10:
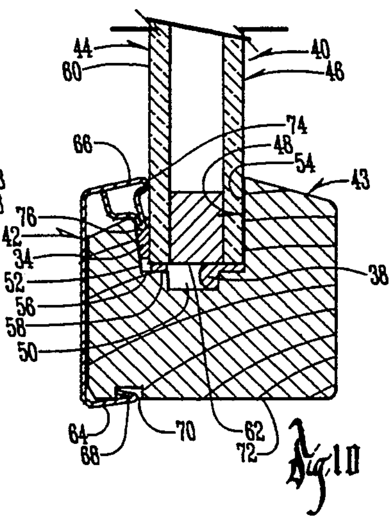

The steps of assembly of the glazing 40 into the groove 48 are illustrated in FIGS. 7–9 and are similar to FIGS. 3–5. The butyl sealant 34 is positioned on the exterior face of the glazing 40 adjacent the peripheral edge 62 while silicone 38 is placed on the peripheral edge 62 below the interior pane 46 or may be placed directly in the groove 48 adjacent the interior wall 54. As the glazing 40 is lowered into the groove 48 the butyl sealant 34 rolls and spreads along the exterior wall 52. The silicone 38 is pressed into the grooves 48 and 50 along the peripheral edge 62 of the glazing 40. It is seen again that the silicone adhesive 38 is restricted to the grooves 48 and 50 and is prevented from reaching the viewable areas of the glazing 40. The sealant 34 neatly fills the space between the exterior face 60 of the glazing and the exterior wall 52 of the groove 48 and requires no trimming after assembly.

It is seen that the cladding 42 is U-shaped having an exterior leg 64 and an interior leg 66. The exterior leg 64 has a return bend 68 which is received in a slot 70 formed in the peripheral face 72 of the frame 43. The interior leg 66 has an inner nose 74 and an outer nose 76. The inner nose 74 engages the exterior face 60 of the glazing 40 while the outer nose 76 engages the sealant 34 in the space between the exterior face 60 of the glazing 40 and the exterior wall 52 of the groove 48. It is seen that the sealant 34 is totally concealed and a seal is formed between the cladding 42 around the wood frame 43 preventing moisture from getting between the cladding 42 and the wood frame 43.

Figure 11:
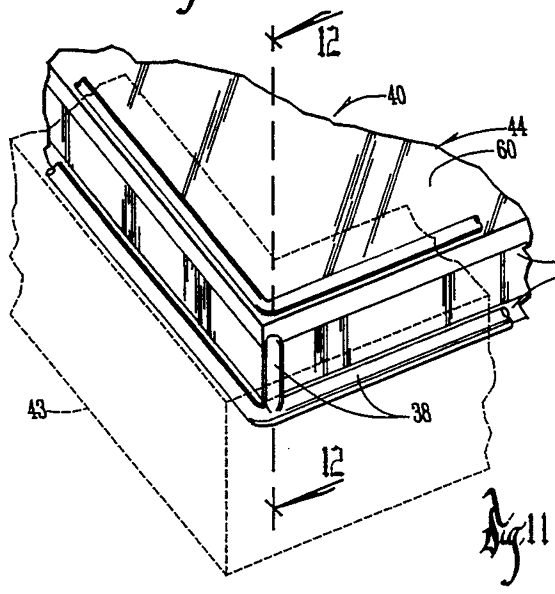
FIG. 11 is a fragmentary perspective view of a corner of the sash illustrating the location of the butyl sealant and silicone adhesive.
Figure 12:
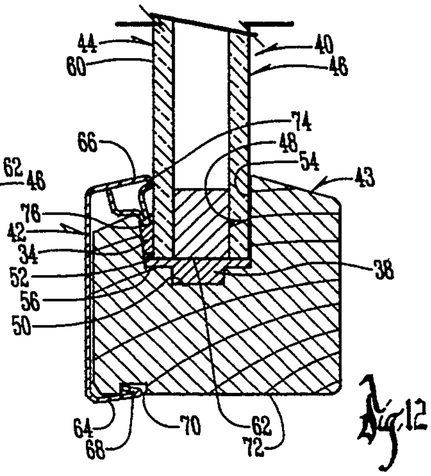
FIG. 12 is a cross sectional view taken along line 12—12 in FIG. 11.

In FIGS. 11 and 12 it is seen that silicone adhesive is placed across the corners of the glazing 40 and is pressed such that the entire grooves 48 and 50 are filled.

Thus it is seen that a simplified window sash and method of assembling same has been provided which requires no clean up after assembly. The use of jigs is minimized by the sealant 34 holding the assembly together while the adhesive 38 is setting up.

What is claimed is:

1. A window sash construction comprising a closed frame, a substantially continuous groove for receiving the edges of glazing material herein, said glazing material having inside and outside faces, exterior and interior window stops unitary with said frame member defining rigid exterior and interior walls for said groove, said groove having a bottom wall between said interior and exterior walls, adhesive means in said groove engaging said bottom wall and the edges of said glazing material, and sealant material between said exterior window stop and said outside face of said glazing material adjacent said edges, the inside face of said glazing material directly engaging said interior stop wall and said outside face of said glazing material being spaced from the outside stop wall with said space therebetween being substantially filled by said sealant, and said sealant being flexible to allow limited lateral movement of said glazing material in said groove and function as a cushion for said glazing material, said edge of said glazing material having substantial width and said adhesive being positioned only along a portion of said edge adjacent said inner face of said glazing material, and non adhesive spacer means being positioned in said groove adjacent said outer face of said glazing material and engaging only a portion of said edge adjacent said outer face of said glazing.

2. A window sash construction comprising a closed frame, a substantially continuous groove for receiving the edges of glazing material therein, said glazing material having inside and outside faces, exterior and interior window stops unitary with said frame member defining rigid exterior and interior walls for said groove, said groove having a bottom wall between said interior and exterior walls, adhesive means in said groove engaging said bottom wall and the edges of said glazing material, and sealant material between said exterior window stop and said outside face of said glazing material adjacent said edges, and said closed frame having an exterior surface in a plane parallel to said glazing material, said exterior surface merging into a lateral surface extending to the exterior face of said exterior stop, cladding material positioned on said exterior and lateral surfaces and including a nose edge engaging said sealant between said exterior window stop and said outside face of said glazing material.

3. The structure of claim 2 wherein said nose edge includes inner and outer nose edge portions with said outer nose edge portion engaging said sealant and said inner nose edge portion engaging said exterior face of said glazing material.

4. The structure of claim 3 wherein said inner and outer nose edge portions are spaced apart.

5. A window sash construction comprising a closed frame, a substantially continuous U-shaped groove for receiving the edges of glazing material therein, said glazing material having inside and outside faces, exterior and interior window stops unitary with said frame member defining rigid exterior and interior walls for said groove, said groove having a bottom wall between said interior and exterior walls, adhesive means in said groove engaging said bottom wall and the edges of said glazing material, and non-adhesive sealant material between said exterior window stop and said outside face of said glazing material adjacent said edges and outwardly of said adhesive means, the inside face of said glazing material directly engaging said interior stop wall and said outside face of said glazing material being spaced from the outside stop wall with said space therebetween being substantially filled by said sealant, said sealant being flexible to allow limited lateral movement of said glazing material in said groove and function as a cushion for said glazing material, and said edge of said glazing material having substantial width and said adhesive being positioned only along a portion of said edge adjacent said inner face of said glazing material.

6. The structure of claim 5 wherein non adhesive spacer means is positioned in said groove adjacent said outer face of said glazing material and engages only a portion of said edge adjacent said outer face of said glazing.

7. The structure of claim 7 wherein said closed frame has an exterior surface in a plane parallel to said glazing material, said exterior surface merging into a lateral surface extending to the exterior face of said exterior stop, cladding material positioned on said exterior and lateral surfaces and including a nose edge engaging said sealant between said exterior window stop and said outside face of said glazing material.

8. The structure of claim 7 wherein said nose edge includes inner and outer nose edge portions with said outer nose edge portion engaging said sealant and said inner nose edge portion engaging said exterior face of said glazing material.

9. The structure of claim 8 wherein said inner and outer nose edge portions are spaced apart.

10. The structure of claim 7 wherein said nose edge of said cladding substantially conceals and covers said sealant.

11. A method of constructing a window sash comprising the steps of, providing a closed frame having a substantially continuous groove for receiving the edges of glazing material therein, placing adhesive means between the peripheral edge of said glazing material and the bottom of said continuous groove, placing sealant means between the outside face of said glazing material and the exterior wall of said groove, inserting said glazing material into said groove causing said sealant to spread along said outside face of said glazing and said exterior wall of said groove to substantially fill the space therebetween, and attaching cladding to the exterior surfaces of said closed frame such that the sealant is substantially covered and concealed.

12. The method of claim 11 and the step of providing cladding having a nose edge which engages said sealant when said cladding is attached to said frame.

13. The method of claim 12 wherein the step of providing cladding having a nose edge further includes having inner and outer nose edge portions with the outer nose edge portion engaging the sealant and the inner nose edge portion engaging the exterior face of said glazing material.

14. A method of constructing a window sash comprising the steps of, providing a closed frame having a substantially continuous U-shaped groove for receiving the edges of glazing material therein, placing adhesive means between the peripheral edge of said glazing material and the bottom of said continuous groove by placing the adhesive on the peripheral edge of said glazing prior to said glazing material being inserted into said groove, placing non adhesive moldable sealant means between the outside face of said glazing material and the exterior wall of said groove, and inserting said glazing material into said groove, positioning the inside face of said glazing material in direct engagement with the interior wall of said groove, and causing said sealant to spread along said outside face of said glazing and said exterior wall of said groove to substantially fill the space there between.

15. A method of constructing a window sash comprising the steps of, providing a closed frame having a substantially continuous U-shaped groove for receiving the edges of glazing material therein, placing adhesive means between the peripheral edge of said glazing material and the bottom of said continuous groove, placing non adhesive moldable sealant means between the outside face of said glazing material and the exterior wall of said groove, inserting said glazing material into said groove, positioning the inside face of said glazing material in direct engagement with the interior wall of said groove, and causing said sealant to spread along said outside face of said glazing and said exterior wall of said groove to substantially fill the space therebetween, and attaching cladding to the exterior surfaces of said closed frame such that the sealant is substantially covered and concealed.

16. The method of claim 15 and the step of providing cladding having a nose edge which engages said sealant when said cladding is attached to said frame.

17. The method of claim 16 wherein the step of providing cladding having a nose edge further includes having inner and outer nose edge portions with the outer nose edge portion engaging the sealant and the inner nose edge portion engaging the exterior face of said glazing material.

18. The method of claim 17 and the further step of providing said inner and outer nose edge portions in a spaced apart relationship.

19. A method of constructing a window sash comprising the steps of, providing a closed frame having a substantially continuous U-shaped groove for receiving the edges of glazing material therein, placing adhesive means between the peripheral edge of said glazing material and the bottom of said continuous groove only between the peripheral edge and the bottom of said groove, placing non adhesive moldable sealant means between the outside face of said glazing material and the exterior wall of said groove and, inserting said glazing material into said groove, positioning the inside face of said glazing material in direct engagement with the interior wall of said groove, and causing said sealant to spread along said outside face of said glazing and said exterior wall of said groove to substantially fill the space there between.

* * * * *